United States Patent [19]

Deysson et al.

[11] Patent Number: 4,483,697
[45] Date of Patent: Nov. 20, 1984

[54] COMPACT GAS LIQUID SEPARATOR

[75] Inventors: Jean-Yves J. Deysson, Paris; André P. L. Potiron, Elancourt, both of France

[73] Assignee: Bertin & Cie, Plaisir, France

[21] Appl. No.: 381,912

[22] Filed: May 25, 1982

[30] Foreign Application Priority Data

May 26, 1981 [FR] France .................... 81 10431

[51] Int. Cl.³ ............................................ B01D 19/00
[52] U.S. Cl. ......................................... 55/205; 55/38;
55/204; 55/315; 55/338; 55/396; 55/426;
55/465; 55/468; 55/206
[58] Field of Search ................... 55/38, 184, 185, 201,
55/204, 205, 315, 338, 345, 396, 413, 426, 441,
454, 206, 458, 462, 465, 468, DIG. 14

[56] References Cited

U.S. PATENT DOCUMENTS

| 617,480 | 1/1899 | De Rycke | 55/338 |
| 1,774,301 | 8/1930 | Terry, Jr. | 55/DIG. 14 |
| 2,578,568 | 12/1951 | Mayer et al. | 55/205 |
| 2,779,503 | 1/1957 | Wright et al. | 55/205 |
| 3,358,425 | 12/1967 | Bornham, Sr. | 55/468 |
| 4,341,540 | 7/1982 | Howerin | 55/465 |

FOREIGN PATENT DOCUMENTS 2151087  4/1972  Fed. Rep. of Germany ........ 55/204

Primary Examiner—David Lacey
Attorney, Agent, or Firm—A. W. Breiner

[57] ABSTRACT

Compact gas-liquid separator comprising a cylindrical separation chamber including an inlet head and a degasifying vessel. The inlet head comprises an inlet tube supporting a nozzle positioned adjacent to the inner wall of a cover situated within the axis of the separation chamber. The cover includes a cylindrical portion closed by a convex cap and extends toward the bottom by a skirt closing the degasifying vessel and having openings. Within the axis of the nozzle the cylindrical portion has an opening of a diameter greater than that of the nozzle and is spaced from the nozzle. The cover includes a deflector having a central opening and being inclined with respect to the axis of the cylindrical portion of the cover and disposed within the axis of the nozzle. An outlet tube for the gas is positioned in the inlet head.

8 Claims, 5 Drawing Figures

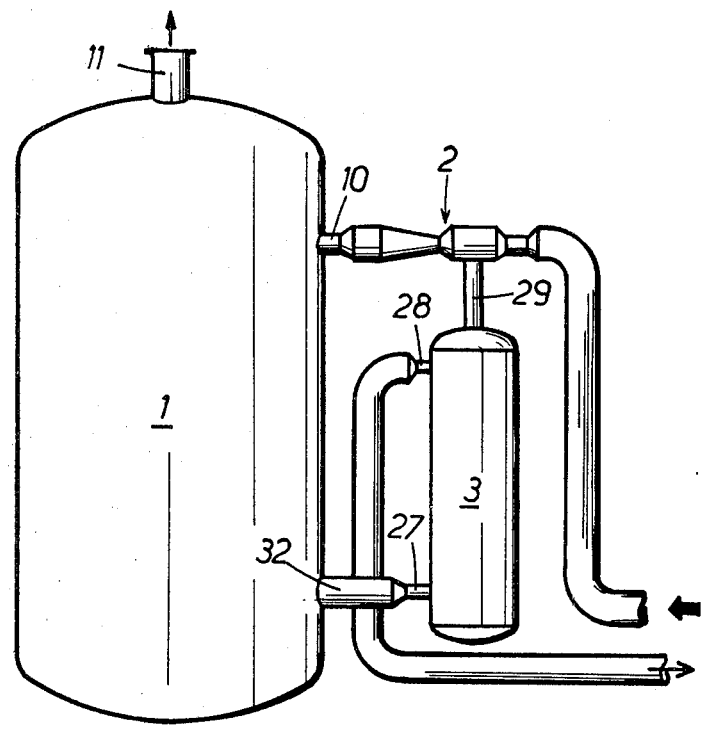
FIG.:1
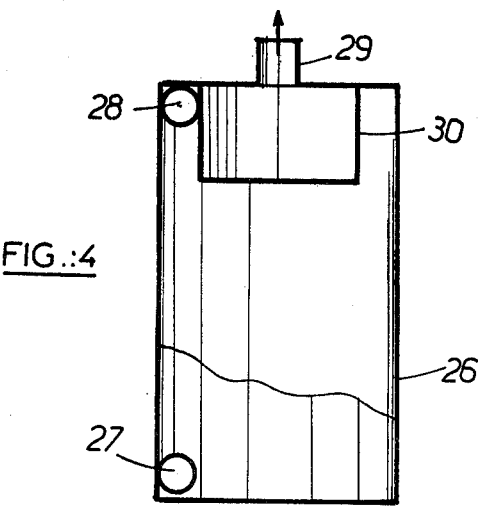
FIG.:4
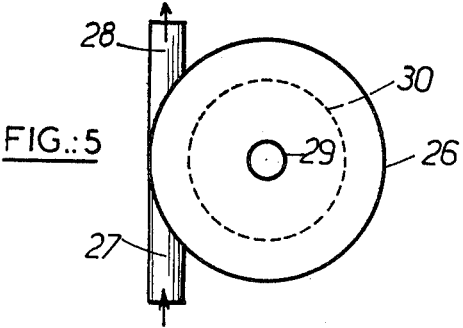
FIG.:5

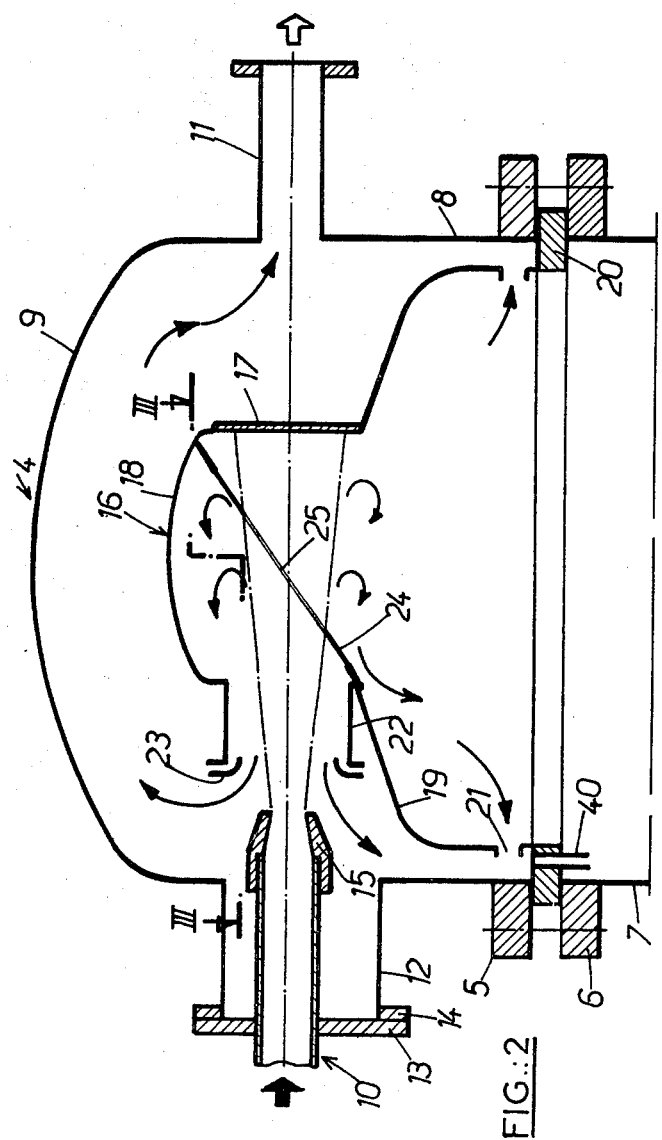
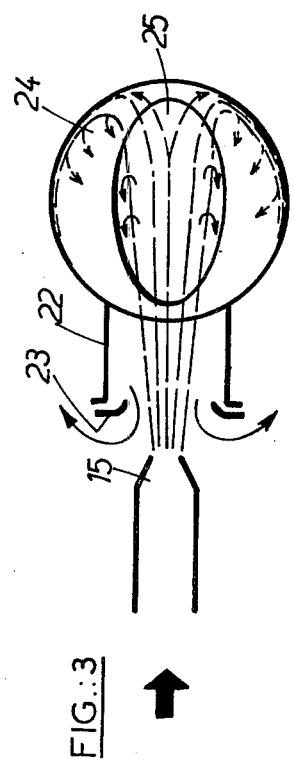
FIG.:2
FIG.:3

COMPACT GAS LIQUID SEPARATOR

The invention concerns a compact gas-liquid separator and in particular a separator for gas contained in crude petrol during its extraction.

The crude petrol collected at the outlet from the head of an oil well contains gas and water. It is necessary to effect the separation of these two products to obtain a crude oil capable of being transported by tanker or by pipeline under the acceptable conditions of safety and economy.

The separation of gas from the crude oil in the apparatus used at the present time is produced by gravity or by centrifuging. The gravity system uses chambers of large dimensions in which the petrol resides for some minutes or tens of minutes. These chambers are heavy and require substantial space. To reduce these disadvantages, the separators have been equipped with an input system of the cyclone type. French Pat. No. 2,372,646 describes an input assembly for a separation vat which includes a chamber comprising a spiral wall closed by terminal walls. The input tube is arranged against the interior wall so that the liquid is subjected to a divergent trajectory movement reducing its velocity and permitting the gas separation. This assembly reduces the formation of foam as the flow arrives in the mass of degasified liquid and reduces the entrainment of the gas.

Despite certain advantages, the aforesaid arrangement is relatively cumbersome.

The present invention has as an object in providing a separator comprising, inter alia, an input assembly arranged in the separation chamber and optionally one or more complimentary degasifying devices.

The description and drawings provided hereafter, by way of example, will illustrate how the invention may be carried out.

FIG. 1 shows a separator comprising complimentary degasifying devices.

FIG. 2 is a view in partial section of the separation chamber of FIG. 1 and of the inlet head.

FIG. 3 is a partial view according to cross-section line III—III in FIG. 2.

FIG. 4 is a sectional view of an embodiment, by way of example, of a complimentary degasifying device.

FIG. 5 is a plan view of the device illustrated in FIG. 4.

FIG. 1 shows diagrammatically a gas and liquid separator which includes a separator chamber 1 and two complimentary degasifying devices 2 and 3 which will be described later.

The separation chamber 1 is presented in the form of a substantially vertical cylindrical volume and includes an inlet head 4 (FIG. 2) fixed by a flange 5 to the flange 6 of a degasifying vessel 7 carrying at its lower part an outlet 32 for the degasified crude oil.

The head is formed by a cylindrical collar 8 closed by a convex cap 9. An inlet tube 10 for the crude oil arriving from the head of the well and an outlet tube for the separated gas 11 are fixed diametrically opposed to the collar 8. According to the arrangement of FIG. 1, the outlet for the gas 11 is fixed coaxially on the cap of the head. The inlet tube 10 is coaxial with a cylindrical sleeve 12 fixed to the collar in which it is maintained by a support 13 bolted to a collar 14 of the sleeve. The free end of the tube is headed by an interchangeable nozzle 15. A cover 16 having a cylindrical portion 17 closed by a convex cap 18 is located at the center of the head. This cover is extended downwardly by a cylindrical conical skirt 19 fixed to a collar 20 clamped between flanges 5 and 6 of the chamber.

In accordance with an embodiment (not shown) the cylindrical portion of the skirt of the same diameter as that of the collar forming the head, could alternatively be fixed directly to the wall 8 and flanges 5 and 6 omitted. At its lower periphery, the skirt has openings 21 permitting evacuation through the outlet 11 of the gas coming from the degasification of the crude oil contained in the separation chamber.

The collar 20 is provided with conduits 40 permitting liquid to be brought into the vessel 7 which could be located between the cylindrical conical skirt 19 and the wall 8.

Perpendicular to its axis, the cover 16 supports a cylindrical sleeve 22 of a diameter greater than that of the inlet tube 10 and coaxial with the tube 10 and with the nozzle 15. The length of the sleeve is such that, between the end of the nozzle 15 and the opening of sleeve 22, there is a free space. This opening is provided to receive an interchangeable diaphragm 23. The openings from the nozzle and from the diaphragm are chosen as a function of the flow of crude oil to be treated and of its gas content.

The cover 16 is separated obliquely by a deflector 24 fixed in an inclined plane facing the arrival of the crude. At its center, this deflector includes an elliptical opening 25 (FIG. 3) permitting the free passage of the jet of crude but preventing the return of the liquid towards the inlet by travelling along the wall of the cover.

The operation of the inlet head is as follows: the crude petrol under pressure leaves the nozzle 15 in the form of a jet, the opening of the jet being dependent upon the diameter of the nozzle chosen so that the jet passes freely within the sleeve 22 and the opening 25 of the deflector 24 and so as to strike the opposite cylindrical wall of the cover. As a result of the impact, the gas-liquid mixture is separated at least partially, the liquid falling into the vessel while the gas flows out partially along the periphery of the sleeve 22 and through the openings 21 in the skirt 19 and reaches the outlet 11 through the space between the cover and the cap 9 of the inlet head as indicated by the arrows.

The separation chamber together with the inlet head which has just been described, may be combined with supplementary devices as shown in FIG. 1. In fact, the liquid collected in the vessel 7 may still retain gas. In this case, by transferring the crude oil coming from the chamber into a centrifugal separator, a gas content much less than 5 percent is obtained, generally acceptable for the transport or storage of the crude oil.

Having been subjected to degasification in chamber 1, the crude oil is transferred into a centrifugal separator 3 in which a permanent suction is provided. This suction is obtained by passing the crude oil coming from the head of the well into the venturi of a suction pump 2 in communication with the top of the separator 3.

In accordance with the embodiment shown in FIGS. 1 and 4, the centrifugal separator 3 comprises a vertical cylindrical chamber 26 supporting tangentially at the top a tube 28 and at the bottom tube 27. These tubes are, respectively, the inlet for the oil coming from the separation chamber 1 and the outlet for the liquid. There is also an axial extraction tube 29 in the upper wall of chamber 26. A skirt 30 concentric with the chamber of the separator is fixed to the upper wall and facilitates the separation between the centrifugal outlet for the liquid and the axial outlet for the liquid gas mixture.

According to other embodiments, the centrifugal separator 3 may not have an inner cylindrical skirt and/or the separator can have the inlet and outlet inverted. Only the upper axial outlet is unchanged.

It is also possible to replace the supplementary cylindrical separator previously described by a separator of another type without modifying radically the operation of the separator which is the subject of the invention.

According to one example of the separator for processing 25,000 barrels/day (ratio between volume of gas and volume of oil GOR 100 $m^3/m^3$), the separation chamber 1 has a diameter of 2 m and a height of 3.20 m, and the supplementary centrifugal separator 3 has a diameter of 0.50 m and a height of 1.50 m. The pressure of the crude at the inlet is 12 bars and the pressure of the degasified oil at the outlet from the centrifugal degasifyer is 10 bars. The time that the crude remains in the separator is at least 1 minute permitting complete separation of bubbles of 100 μm in diameter. The concentration of free gas in the crude at the outlet is less than 5 percent.

The vessel 7 may, of course, comprise the usual components customary in such devices. Moreover, the inlets and outlets for the fluid comprise the usual control devices (not shown).

We claim:

1. A compact gas-liquid separator for separating the gas contained in crude petrol from the crude oil at the time of its extraction comprising at least one cylindrical separation chamber having an axis which includes an inlet head and a liquid outlet and a degasification vessel, said inlet head comprising an inlet tube and a nozzle supported thereby and a cover, said nozzle positioned adjacent the inner wall of said cover, said cover including a cylindrical portion closed by a cap and said cover extending towards the bottom of said at least one separation chamber through a skirt closing the degasification vessel and including openings, said cylindrical portion of said cover, facing said nozzle, having an opening of a diameter greater than that of the said nozzle and spaced from the latter, said cover further including a deflector positioned therein and inclined with respect to the axis of the cylindrical portion of the cover, said deflector having a central opening disposed along the longitudinal axis of the nozzle and an outlet tube for the gas being positioned in provided at the inlet head.

2. A separator according to claim 1, wherein said nozzle is orientated transversely with respect to the axis of the separation chamber.

3. A separator according to claim 1 or claim 2, wherein said opening in the cylindrical portion of the cover is surrounded by a sleeve the free end of which is spaced from the end of the nozzle and the diameter of which is greater than that of the nozzle.

4. A separator according to claim 3, wherein said nozzle is interchangeable and said opening of the sleeve of the cylindrical portion of the cover supports an interchangeable diaphragm.

5. A separator according to claim 4, comprising a centrifugal separator in flow communication with the liquid outlet of the separation chamber for receiving the liquid from said separation chamber.

6. A separator according to claim 5, comprising at said inlet tube of said inlet head of said separation chamber a suction pump, the suction tube of said pump being connected to a gas outlet from said centrifugal separator.

7. A separator according to claim 6, wherein said centrifugal separator is cylindrical and comprises a tangential inlet tube for the liquid and a tangential outlet tube for the liquid from which the gas has been separated therefrom.

8. A separator according to claim 7, wherein said centrifugal separator comprises an inner cylindrical skirt arranged coaxially with respect to the gas outlet of said centrifugal separator.

* * * * *